United States Patent

[11] 3,601,896

| [72] | Inventor | Ernest P. Ledene<br>82 and Madison Streets, Hinsdale, Ill. 60521 |
|---|---|---|
| [21] | Appl. No. | 762,889 |
| [22] | Filed | Sept. 26, 1968 |
| [45] | Patented | Aug. 31, 1971 |

[54] MEASURING TAPE CLIP
1 Claim, 3 Drawing Figs.

[52] U.S. Cl. .................................................... 33/137
[51] Int. Cl. ............................................. G01b 3/02, G01b 3/10
[50] Field of Search .......................................... 33/137

[56] References Cited
UNITED STATES PATENTS

| 1,860,635 | 5/1932 | Thompson.................... | 33/137 |
| 992,170 | 5/1911 | Crane............................ | 33/137 |
| 1,623,138 | 4/1927 | Swift............................. | 33/137 |
| 3,276,490 | 10/1966 | Johansson.................... | 33/137 |

*Primary Examiner*—Leonard Forman
*Assistant Examiner*—Steven L. Stephan

ABSTRACT: An improved measuring tape clip having self-releasing characteristics so as to eliminate the necessity of a person to return to a starting point for disengagement of the clip from a securing nail or other hooking means, a pivotable spring clip member secured to a clip body.

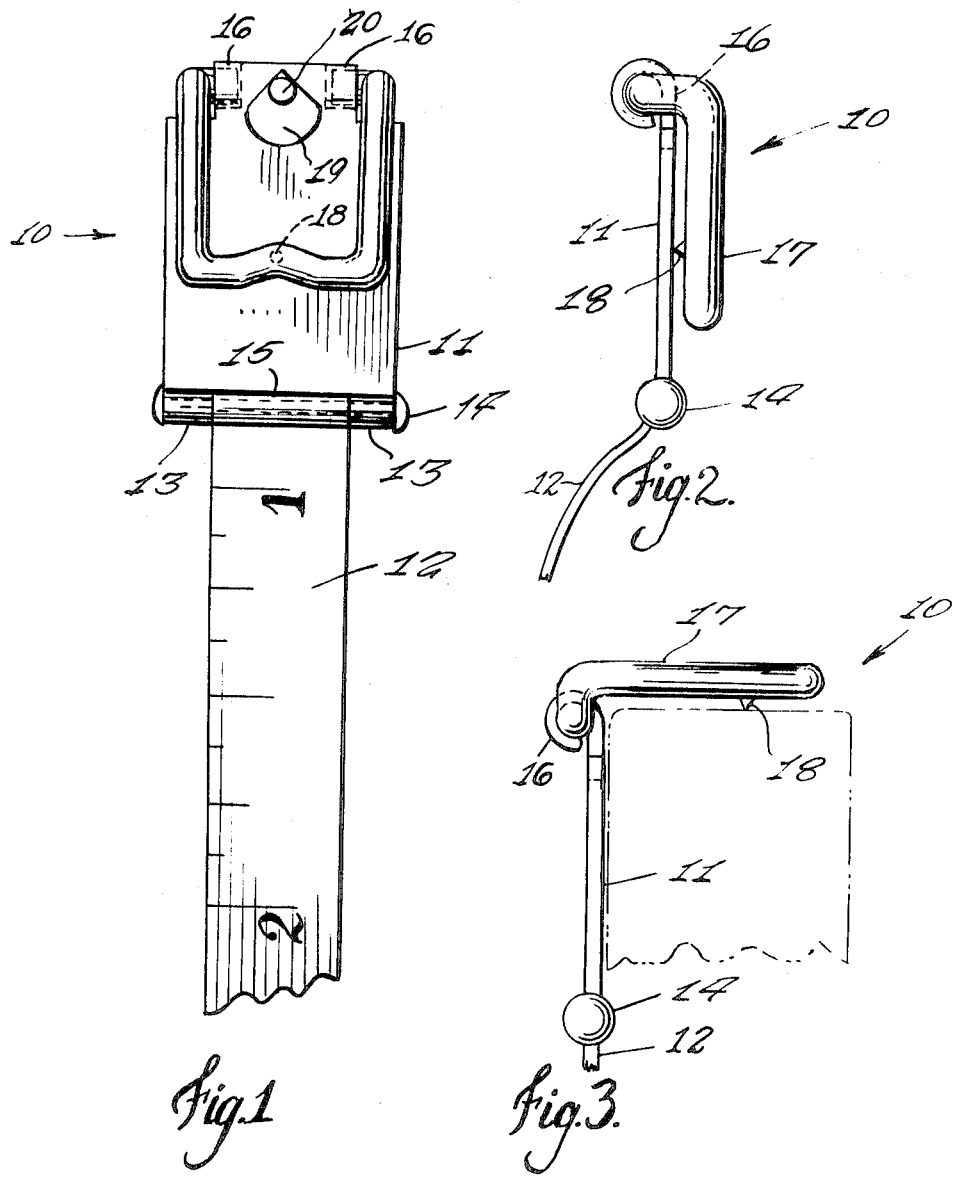

MEASURING TAPE CLIP

This invention relates generally to tape measure ends.

It is generally well known to those skilled in the art that it is often bothersome for a person making a long measurement to return to the starting end of a tape for purpose of unhooking the end from a securement means adjacent which the measurement began.

Accordingly it is the principal object of the present invention to provide a measuring tape clip which comprises a tape end, the clip having self-releasing means so to eliminate the necessity of a person returning to the starting point after having taken a measurement.

Another object of the present invention is to provide a measuring tape clip which can be used manually in a folded position so to butt to the starting position, or which may be hooked over an item to be measured by placement across the end thereof.

Other objects of the present invention are to provide a measuring tape clip which is simple in design, inexpensive to manufacture, rugged in construction, easy to use and efficient in operation.

These and other objects will be readily evident upon a study of the following specification together with the accompanying drawing wherein:

FIG. 1 is a plan elevation view of one end of a measuring tape showing the present invention incorporated therewith;

FIG. 2 is an edge elevation view thereof shown in one position; and

FIG. 3 is a similar view showing the device in an alternate position.

Referring now to the drawing in detail, the reference numeral 10 represents a measuring tape clip, according to the present invention, wherein there is a clip body 11 at one end of a measuring tape, the clip body 11 having a rolled edge to form bearings 13 for receiving pin 14 therethrough, the measuring tape end likewise being rolled to form a bearing 15 through which the pin 14 extends.

The clip body 11 is made from approximately one thirty second thick metal, the upper portion thereof being tubular as shown at 16 for purpose of receiving the opposite ends of a steel spring clip 17 of generally U-shaped configuration. The spring clip is pivotable between the positions shown in FIGS. 2 and 3 of the drawing. The spring clip including a spur 18 for the purpose of penetrating a material against which it may be held during measuring operation.

The clip body further includes an opening 19 near one end thereof for purpose of receiving a nail 20 to which the device may be anchored.

In operative use, the device may be used as shown in the position illustrated in FIG. 3 of the drawing for the purpose of measuring length of lumber or the like, and wherein the spring steel clip element 17 is hooked over the lumber end. After taking a measurement, the person at the other end of the measuring tape simply gives a small tug to the measuring tape thus causing the steel spring clip to flex so to cause the clip element 17 to snap over and allow taking in the tape without the necessity of going to the first end thereof for unhooking purposes. The device may also be used manually in a folded position as is illustrated in FIG. 2 of the drawing wherein the spring clip element will butt against an object from which a measurement is to be taken.

While various changes may be made in the detailed construction, it is understood that such changes will be within the spirit and scope of the present invention as is defined by the appended claims.

What I claim is:

1. In a measuring tape clip, the combination of an end member secured to one end of a measuring tape, said end member including self-contained means for being self-releasing after having been temporarily secured for measuring purposes, said end member being comprised of a clip body and a spring steel clip element having spring steel properties so to flex, said clip body comprising a generally flat member having opposite rolled edges, one of said rolled edges securing a transverse extending pin around which said measuring tape is secured, the opposite rolled edge of said clip body comprising bearing means for receiving the opposing ends of an open ring configurating said spring steel clip element, and said spring steel clip element having an outwardly extending spur along a side thereof, an opening being provided through said clip body near the last said rolled edge, said opening serving to receive a nail for retaining the device during measuring operation.